May 23, 1961

M. L. QUIN 2,985,090

APPARATUS FOR COMBINING AIR SUPPLY AND
EXHAUST WITH LIGHTING EQUIPMENT

Filed Jan. 9, 1959

INVENTOR
MURRAY L. QUIN

By Gravely, Lieder & Woodruff
ATTORNEYS

INVENTOR:
MURRAY L. QUIN

By Gravely, Lieder & Woodruff
ATTORNEYS

United States Patent Office 2,985,090
Patented May 23, 1961

2,985,090

APPARATUS FOR COMBINING AIR SUPPLY AND EXHAUST WITH LIGHTING EQUIPMENT

Murray L. Quin, Overland, Mo., assignor, by mesne assignments, to Day-Brite Lighting, Inc., St. Louis, Mo., a corporation of Missouri Filed Jan. 9, 1959, Ser. No. 785,925

6 Claims. (Cl. 98—40)

This invention relates to improvements in apparatus for combining air supply and exhaust with lighting equipment for enclosed spaces, living and working areas, offices and the like.

The present architectural demands toward flexible planning of living and working spaces and for supplying personal comfort and good lighting is creating problems of complex equipment to handle the demands, and construction costs have increased in proportion to the degree of flexibility desired. In the past flexible planning has been based upon complete individuality of lighting apparatus and air-conditioning or ventilating serivces so that as changes occurred, one or more of these items could be relocated and moved without disrupting the others. However, such individuality has actually been a deterring factor so that flexibility has actually been held back.

A most important function of any building use is that it provide a comfortable environment and the services to provide the desired environment include lighting and conditioning of the air in the building spaces. On an individual basis the lighting service and conditioned air service has been quite acceptable, but it has lacked the desired degree of flexibility which is most demanded. If, for example, a work space of given dimensions is provided with proper lighting service and conditioned air service, that space may not be changed by enlarging or decreasing the dimensions without disturbing the services, or without impairing the adequacy of the services if no fundamental changes are made. On the other hand, a similar space may be rendered flexible if the services therein, such as lighting and conditioned air, can be moved about without moving the apparatus or fixtures. Heretofore, attempts have been made to provide combination apparatus for lighting and conditioned air, but fully successful combination apparatus has not been attained in view of the basic differences in the requirements of design for efficient lighting and for efficient air movement.

It is known that lighting apparatus efficiency depends, in great part, upon proper design of reflective surfaces, light control, lamp temperature, and other factors of a critical nature. Air flow controlling and directing apparatus also possesses critical design factors depending upon such things as the temperature of the air, the pressure gradient causing flow, the direction of movement, and the rate of flow or volume of air in the movement. When the two types of apparatus are combined the critical design factors of each need to be preserved without impairment. This has been found heretofore to introduce further difficultiees because of certain code requirements for lighting apparatus which differ from that for air flow apparatus. One of the important advantages is that the combined apparatus provides for substantial isolation of the electrical components from the air flow so that moisture or condensation will not endanger the electrical service.

Therefore, it is a broad object of the present invention to provide apparatus of improved character which will serve for multiple function service and make possible the selective uses heretofore pointed out so that a greater degree of flexibility is made available.

The present invention has as a more particular object the aim to overcome the objections found in apparatus heretofore used, and to provide a more universally adaptable arrangement in a lighting fixture which will broaden its function to suit air supply and exhaust systems.

It is another object of this invention to provide a unique lighting fixture which may be initially installed to provide illumination service, but which may at a subsequent time be easily expanded to include multiple service as and when air supply or exhaust, or combinations of air supply and exhaust is desired.

It is also an object of this invention to provide apparatus which may be initially installed to serve the functions of lighting, and also be capable of serving supply and exhaust systems, including heating, cooling, and ventilating, and to accomplish these services in a simple arrangement and at relatively low cost.

Another object of the invention is to provide apparatus suitable for mounting in a suspended type ceiling assembly so that it may be associated with the plenum space above such ceiling or connected to a duct system therein, whereby multiple service functions heretofore explained may be obtained.

Another object of the invention is to provide illuminating apparatus with a simple arrangement of parts of an interchangeable character to expand the lighting function thereof to incorporate air conditioning, or heating, or air circulation of either supply or exhaust type, or any combination of such services in a duct system or in a plenum system.

Another object of the invention is to provide illuminating apparatus in which air flow connections are incorporated, and to dispose the connections for easy use, and it is also an object to provide air flow control means, such as a novel partition with knockouts and with movable vanes so that one or more air flow patterns may be selected for obtaining the character of service desired.

Other objects and advantages of the present invention will become apparent from the following description.

The invention is embodied in a unique lighting apparatus which comprises the features hereinafter described and particularly pointed out in the claims, it being understood that the description given in reference to the drawings sets forth the principles which are indicative of the invention and are not to be taken as limiting the scope thereof or the manner in which the invention may be employed. The invention is also embodied in the parts, elements, and combinations thereof, as well as in such combinations of structure as may be hereinafter described and claimed.

In Figs. 1 to 7 inclusive, the lighting apparatus 10 is adapted to be disposed in the usual manner in an opening in a ceiling 11 composed of tiles, or the like secured in a suitable frame (not shown) so that the apparatus is located in the space or plenum above the ceiling for association with the air moving provision therefor.

Figures 1, 11:
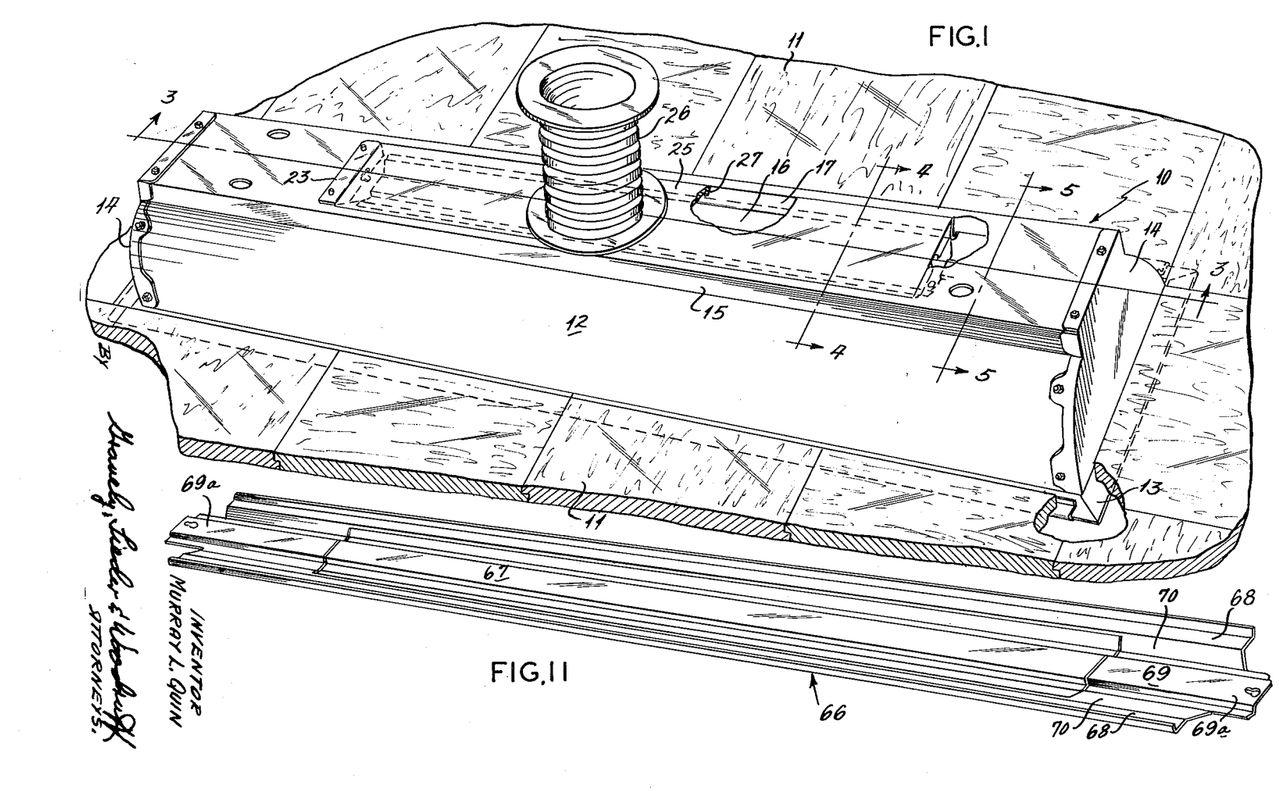
Fig. 1 is a top perspective view of the apparatus of this invention incorporated in a suspended type ceiling shown in fragmentary outline, and in which portions have been broken away to show details thereof.
Fig. 11 is a perspective view of a modified partition member useful in the apparatus of Figs. 8 and 9.
Figure 2:
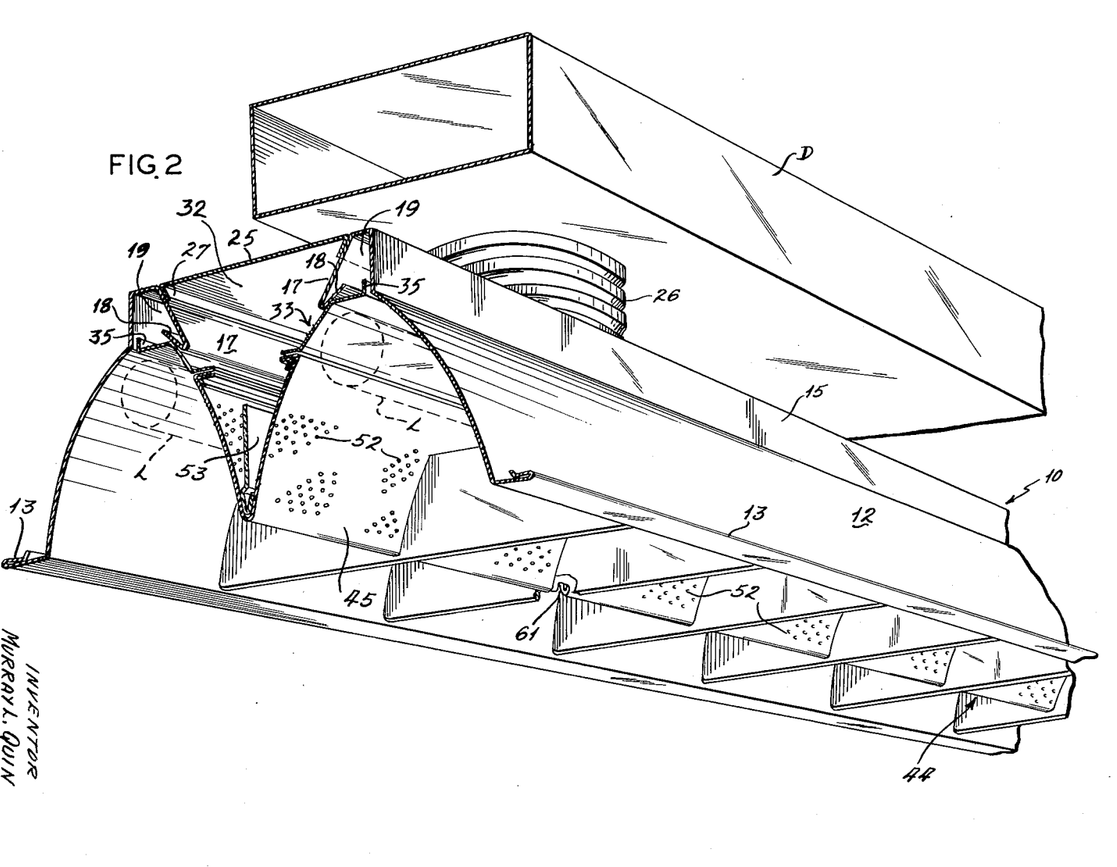
Fig. 2 is a fragmentary perspective view of the apparatus of Fig. 1 as seen from below to show further details thereof.

In the example of Fig. 1, the apparatus 10 has a troffer body 12 formed with a peripheral flange 13 about the light emitting opening. The ends of the troffer are closed by suitable end caps 14. The body 12 is also provided with a longitudinal box-like head 15 in which an enlarged top opening 16 is formed by suitably slitting and bending the material of the top surface between the ends to provide longitudinally extending flange-like walls 17 angularly inturned and carrying further inturned lips 18 to support the electrical wiring (not shown) for the lighting elements or lamps L (Fig. 2). The walls 17 in the head 15 form longitudinal channels 19 (Figs. 2, 4 and 6) at each side of the opening 16, and the channels interconnect a space 20 (Fig. 3) at one end of the head 15 with a space 21 at the opposite end. The space 20 is closed from the opening 16 by a vertical bulkhead 22 (Figs. 3 and 6) secured at the upper outturned flange 23 and closely fitting the angular walls 17 at lips 24. Similarly, the space 21 is closed from the opening 16 by a like bulkhead 22. Thus, the opening 16 to care for air flow internally of the head 15 is defined by the flanges 17 and bulkhead 22, and a suitable aperture cover 25 (Figs. 1 and 6) is set into the opening when the apparatus is to be connected to a duct system, such as duct D shown in Fig. 2, otherwise it may be left open to communicate with the ceiling plenum space as in Fig. 15. It is at once appreciated that in an installation of several such troffer bodies 12 some may be open to the plenum for air flow in a plenum operated system, and others may be connected to a duct system by setting the covers 25 in place and providing a conduit 26 thereon, as shown. The cover 25 is provided with longitudinal flanges 27 and with end flanges 28 having a tang 29 thereon adapted to slip into a suitable retaining strap 30 formed in the respective end bulkheads 23. Each tang 29 projects over a bulkhead recess 31 so that the end portion may be bend outwardly, Fig. 3, to secure the cover in place to form an air box 32 below the opening 16 in the troffer head 15.

The air box 32 in the troffer head 15 is further defined by a partition member 33 (Figs. 2, 3, 6 and 7), in the form of a channel having side horizontal panels 34 with flanged edges 35 which cooperate with lips 18 of the wireway channels 19 to close the same to air flow. The center of the partition 33 is formed with convergent angular panels 36 spaced apart by the center panel 37 and center panel flanking seat strips 38. The partition member 33 is of unique character in that certain areas thereof which are exposed to the air box 32 in the troffer head 15 are suitably treated by known methods to form knock-outs whereby the same may be quickly removed to convert the partition from a blank enclosing wall below the air box 32 to a wall with air flow apertures for the purposes of this invention. The knock-outs include the outer elements 39 and center element 39a in the center panel 37, such knock-outs being formed (Fig. 7) by transverse slots 40 and partly cut parting slits 41 extending lengthwise thereof in the seat strips 38. Similarly the side slanting panels 36 are formed with knock-out elements 42 which are partly sheared and displaced at the margins 43. With the knock-out elements left in place, it is appreciated that the apparatus is useably only as a lighting fixture, and may be installed for that initial function with the unique partition 33 incorporated therein to provide for future conversion of the apparatus to one or more of the possible air flow services to be more particularly described.

Figure 3:
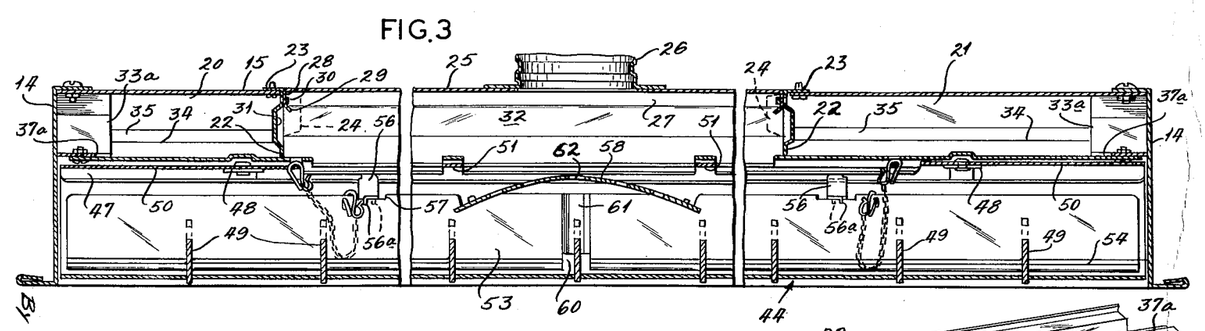
Fig. 3 is a longitudinal, broken sectional elevational view of the apparatus as seen at line 3—3 in Fig. 1.

The apparatus 10, in addition to the partition 33, is provided with a combination light control louver and air diffusing device 44 shown in Figs. 2, 3, 4 and 6. The device comprises a longitudinal louver 45 formed of perforated material and V-shaped in section. The louver 45 is suitably abutted by flanges 46 and spacer means 47 to the flange surfaces 38 of the partition 33, and a suitable knifeblade attachment device 48 secures the same to partition 33 the curved faces of the V serve as light control reflecting members and with the outer curved surfaces of the troffer 12 provide parabolic reflecting means for the respect lamps L. The longitudinal louver 45 supports a series of spaced cross louvers 49 secured in transverse slots in the louver 45, as disclosed in U.S. Patent No. 2,411,952, issued to D. J. Biller on December 3, 1946. The device 44 is, however, modified in that the usual spacer means 47 which extends lengthwise of the V-shaped louver 45 is cut out in the area corresponding with the air box 32 so that the louver 45 is transformed into an air flow and diffusing member. As shown in Fig. 3, the spaced member 47 has opposite end plates 50 which are located respectively beneath the spaces 20 and 21, and spaced straps 51 located at either side of the longitudinal center of the cutout. Thus, air may flow into the V-shaped louver 45 and be diffused at the perforations in the surfaces thereof. The perforations, shown at 52, may be formed in bands in each side of the louver 45, such bands having a width substantially the vertical width of the transverse louvers 49. Perforations are omitted at the apex of the V so that a smooth radius may be obtained.

The device 44 is provided with an internal longitudinal baffle (Figs. 2 and 6) 53 having a nose flange 54 which seats in the crotch of the V-shaped louver 45, and suitable slots 55 to receive the transverse louvers 49. A pair of baffle centering clips 56 with ears 56a are seated in notches 57 in the upper edge of the baffle 53 and are caught under the side flanges 46. A flow equalizing perforated (see Fig. 9) baffle element 58 is carried by the baffle 53 in a notch 59 formed in the upper edge thereof, as shown in Fig. 3, and said element 58 is held in an arcuate position at the notch 59. The baffle element 58 is located below the conduit 26 so that the stream of air entering the apparatus is directed laterally in the louver passage toward the end bulkheads 22 so that air is more uniformly distributed along the device 44 at both sides of the baffle 53 to eventually pass through the perforations 52 in the louver 45. A suitable damper, not shown, may be mounted in the conduit 26, and control of the same is obtained by inserting a suitable tool in opening 60 (Fig. 2) in louver 45, and through the off-set channel 61 (Fig. 3) in baffle 53 and enlarged perforation 62 in baffile element 58.

The apparatus of Figs. 2 and 3 is shown assembled for use in an air supply system for a space illuminated by lamps L, and in so arranging the apparatus it is understood that only the knock-outs 39 and 39a (Figs. 2 and 3) need be removed to open communication between the air box 32 and the longitudinal passage in the louver device 44. The air diffused at perforations 52 will be directed angularly outwardly and downwardly below the ceiling 11 in a flow pattern (depicted in connection with Fig. 12) which achieves a draft-free condition for personal comfort. This flow pattern finds the issuing air moving along the path depicted by arrows A and sets up a circulation in which a certain portion of the room air is induced to rise along the path depicted by arrows B and is picked up in the air streams A and circulated therewith. Such a flow pattern is desirable as the air stream B which may be a carrier of lint, dust and the like is removed from striking the tiles 11 on flanges 13. The usual air outlet devices after a period of use accumulate a dirty area on the surrounding tiles of the ceiling surfaces, however the present apparatus is found to avoid this unsightly result for the reason demonstrated.

Figure 13:
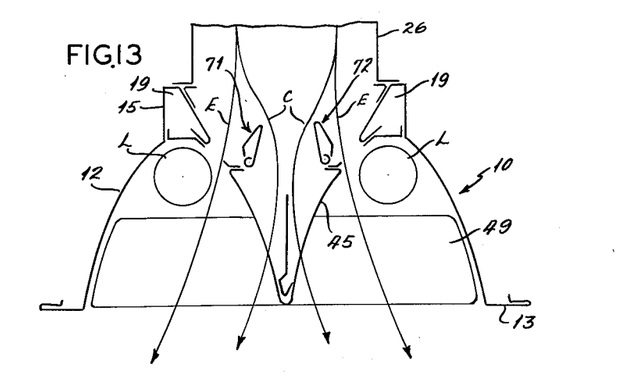
Fig. 13 is another diagrammatic view of a lighting apparatus like Fig. 12, but depicting the air flow pattern through the valve devices in Fig. 8 for heating service.

The same apparatus of Fig. 2 may be employed with a space heating system by also removing the knockouts 42 in the slanting panels 36. Such an arrangement will then cause the air from box 32 to move both through the louver 45 and about the lamps L, as is understood. The flow pattern is depicted in Fig. 13 in diagrammatic manner, but the apparatus is of a modified form. It is to be observed that the heated air in the air box 32 is now delivered to the openings occupied by knock-outs 39, 39a and 42 in the panels 36 and 37 of the partition member 33. Such dual flow combines the spaced streams within the fixture 10 and produces a resultant stream outwardly below the ceiling 11 which is substantially draft-free and capable of uniform dispersion in a large area of the space.

Figure 15:
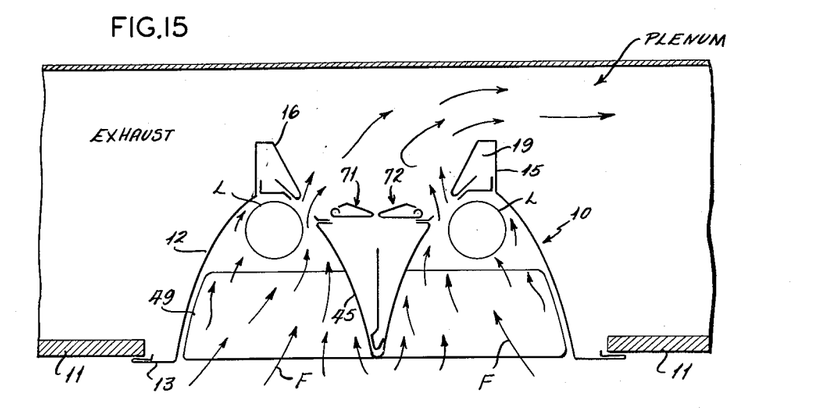
Fig. 15 is another diagrammatic view of the apparatus depicting the air flow pattern for exhaust ventilation service in a plenum system.

It is not good practice to have cooled air flow directly over the lamps L as the efficiency of the lamps is greatly reduced. Therefore, the apparatus of Fig. 2 is useable in a combined cooling and heating system where several of the apparatus may be connected to a cooled air supply with only knock-outs 39 and 39a removed, and others to a heated air supply with all knock-outs removed. Furthermore, as depicted in Fig. 15 in connection with a modification, the apparatus may be employed as an air exhaust device by utilizing the partition 33 with only the knock-out panels 42 removed so that the exhaust air flow is through the resulting apertures behind the lamps L, and no return flow can occur at the perforated louver 45 which would very quickly clog up due to the size of the perforations therein. A complete system of cooling, heating and ventilating is made possible by installing several types of devices hereinabove described in a desired space, or by alternating the arrangement in a ceiling 11. Such a system would not involve special ceiling openings and special fixtures in addition to the apparatus necessary or required to care for the illumination of the space so that the expense of the system is not increased thereby.

Turning now to Figs. 8 to 11, inclusive, there is shown a modified apparatus which comprises structural components of the type shown in Figs. 3, 4, 5, and 6 and other components such as a partition member and adjustable vanes associated therewith. Therefore, where the same parts are described for the modification as have been heretofore described, it will be convenient to use the same reference numerals. Further, it will not be necessary to disclose the entire apparatus in order to explain the modifications.

Figure 5:
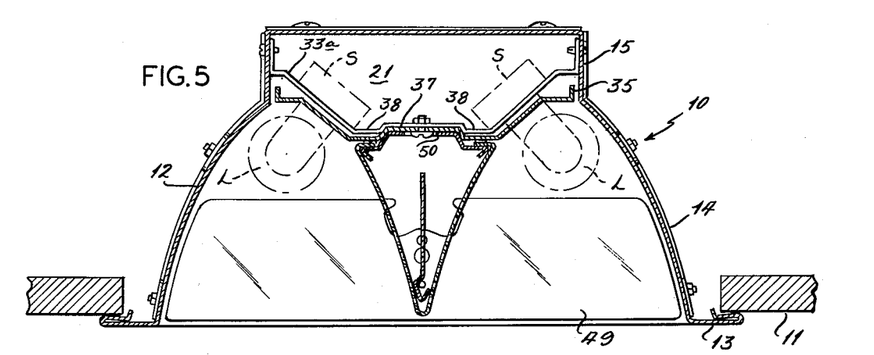
Fig. 5 is another transverse sectional elevational view taken at line 5—5 in Fig. 1.
Figure 6:
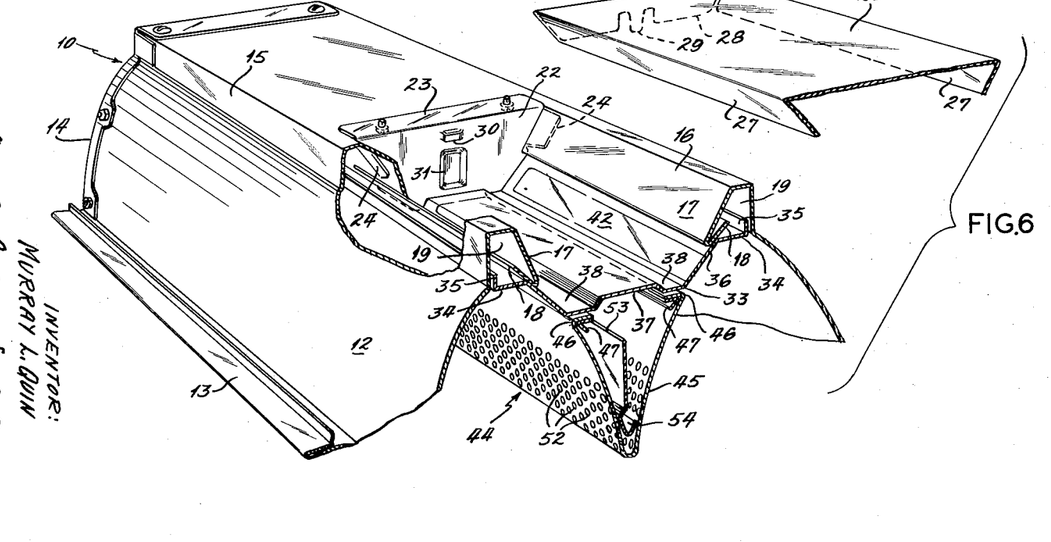
Fig. 6 is an exploded and fragmentary perspective view of a portion of the body of the lighting apparatus disclosing the construction of the air box and cover therefor, together with the wire way passages at the sides.

In Figs. 8 to 11, the troffer body 12 with the head 15 is formed with the top air flow opening 16, as before. End caps 14 are provided to enclose the body, and the flange-like walls 17 with inturned lips 18 to support the electrical wires (not shown) in wire-way channels 19 extending along each side of the air box 32 and connecting the end boxes 20 and 21. The ends of the air box 32 in the head 15 are closed by the bulkheads 22a which are identical with bulkheads 22 in Fig. 6, and are formed with pivot apertures 65 in the depending ears at the lower edge of the bulkhead where the same has been shaped to conform with the shape of the partition 66. The partition member 66 is preferably similar in size and sectional configuration to partition 33 so as to be interchangeable therewith, and is formed by known methods with a knock-out panel 67 of large area between the side panels 68, whereby the side panels are not altered and serve to close the lower sides of the wire-way channels 19. The opposite ends of the central panel 69 and angular panels 70 are not apertured so as to close the under sides of end spaces 20 and 21 in the head 15. End extensions 69a provide means for securing the partition in the apparatus, just as extensions 37a (Fig. 7) serve to secure partition 33. As seen in Fig. 5 bracket 33a is a preformed component secured in the head 15 and having a central depressed portion which matches the contour of the partition. The bracket not only supports partition 33 but supports the lamp sockets S.

The partition 66, is therefore, open in the area between the respective bulkheads 22a and between the side walls 17 for the supply or exhaust of air. Control over the air flow which determines whether the apparatus is to be used for cooling, heating and ventilating services is obtained by providing (Figs. 8, 9 and 19) movable vanes 71 and 72 which are left and right parts, but otherwise similar and the same reference numerals will suffice in their description. For example, vane 72 is formed with a rolled lip 73 along its length to provide stiffness in the longitudinal direction. The rolled lip is formed with a vane plate 74 having a width throughout its length to span the knock-out opening in the angular side panel 70 (Fig. 11) and to span one-half of the knock-out opening in the center panel 69. The same characteristic is also found in vane 72. The vane plate 74 carries a second vane plate 75 having an angular lip 76 which abuts the inturned flange 46 of the louver assembly 44 when the vane is positioned outwardly, as shown. The second vane plate 75 has a free inner edge to make it relatively yieldable so as to afford a tight closure in the side closure positions indicated by full lines in Fig. 9. Each vane may be integrally formed from a flat sheet to present a streamlined shape to the flow of air and reduce the possibility of turbulence in the intermediate positions shown in broken outline in Figs. 8 and 9. The full line position of the vanes 71 and 72 in Fig. 8 indicates closure of the central opening in panel 69 so that louver assembly 44 is closed to the flow of air, and whereby the side openings are fully open.

Each vane 71 and 72 is pivoted between the opposite bulkheads 22a by pivot elements 77 inserted in bulkhead aperture 65 and threaded into the end of the rolled lip 73. A spring washer 78 is disposed over the pivot 77 and at the end of the rolled lip 73 to prevent the end edge of the vane from contacting the bulkhead 22a or binding during adjustment. The method of mounting each of the vanes 71 and 72 causes the respective pivot elements 77 to turn therewith, and it is, therefore, a simple operation to adjust the vanes by inserting a screwdriver in the slotted head 77a from the end spaces 20 or 21 and turn the vanes to the desired positions. The vanes 71 and 72 may be thought of as performing the same functions as were described for the knockouts 38, 39 and 42 in the partition 33 of Fig. 6, with the added advantage that it is not necessary to change the partition when altering the service function of the apparatus. The modified apparatus of Fig. 8, as well as the apparatus of Fig. 6, will perform in any of the ways now to be described and as depicted in Figs. 12, 13 or 15 merely by removing knockouts or adjusting vanes in the manner described.

Figure 7:
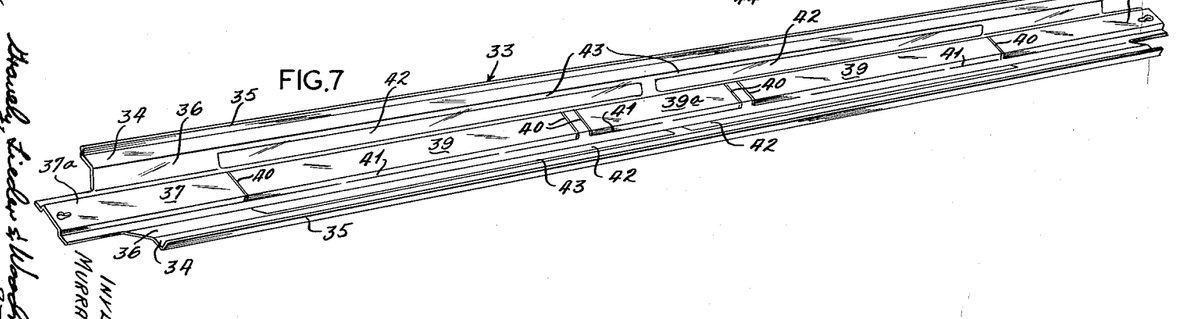
Fig. 7 is a perspective view from above of a partition member formed with knock-outs to adapt the same for use in the apparatus of Fig. 2, the view being of the member prior to removal of the knock-outs.
Figure 12:
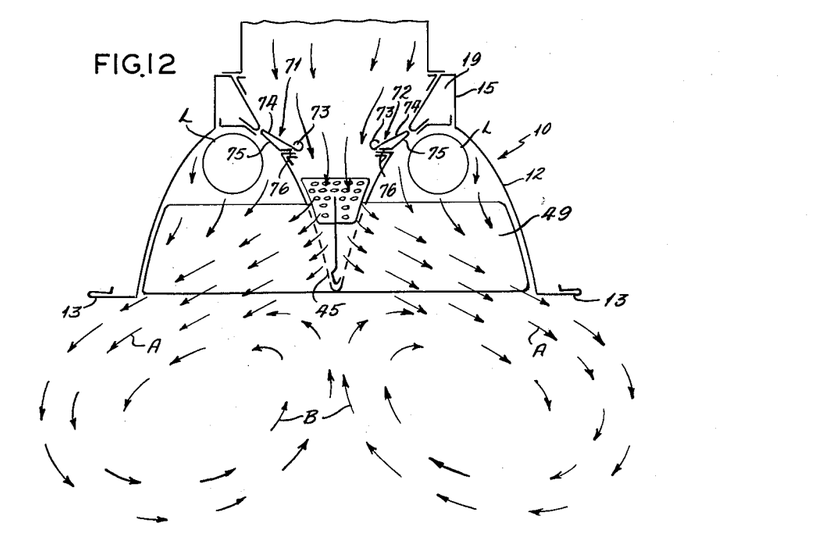
Fig. 12 is a diagrammatic view of a lighting apparatus of the character of Fig. 9 and depicting the air flow pattern for cooling or air conditioning service.

Fig. 12 illustrates the air flow pattern for cooling operation of the apparatus. The initial cool air issuing from the sides of the perforated V-shaped louver 45 set up main streams (arrows A) which are directed outwardly to pass just below the side flanges 13 and sweep down into the room space in divergent relation. The main stream flow of clean cool air keeps the ceiling tiles free of dirt as is most often the result with other types of outlet devices. A secondary effect caused by the divergent main streams is the induced return flow (arrows B) along paths which approach the louver 45 and then diverge to return to streams A. The air in streams B may be laden with dirt which has little opportunity to settle out on the apparatus. Another good effect is the induced flow of cooled air about the lamps L which helps maintain the lamps in a temperature zone which assists in having the most efficient light output. Without induced flow of air about lamps L, the effect of the closed parabolic troughs surrounding the lamps is to trap the heat and keep the lamps at a higher temperature level than is conducive to efficient operation. While Fig. 12 is shown with vanes 71 and 72, it is understood that the vanes may be dispensed with if partition 33 of Fig. 7 is used with knockouts 39 and 39a only removed. In either apparatus, the cooling effect of the air, and the relatively lower temperature state of the parts of the apparatus, such as the device 44, keeps the lamp temperature close to its rated output for most efficient conditions.

Figure 8:
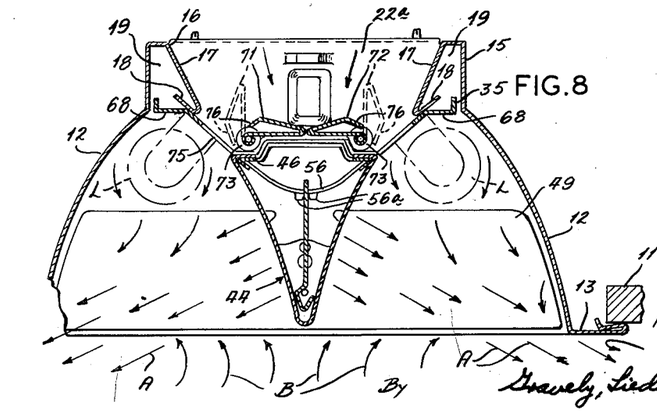
Fig. 8 is a transverse sectional elevational view of a modification of the apparatus shown in Fig. 4, and particularly showing the arrangement of adjustable vanes.
Figure 9:
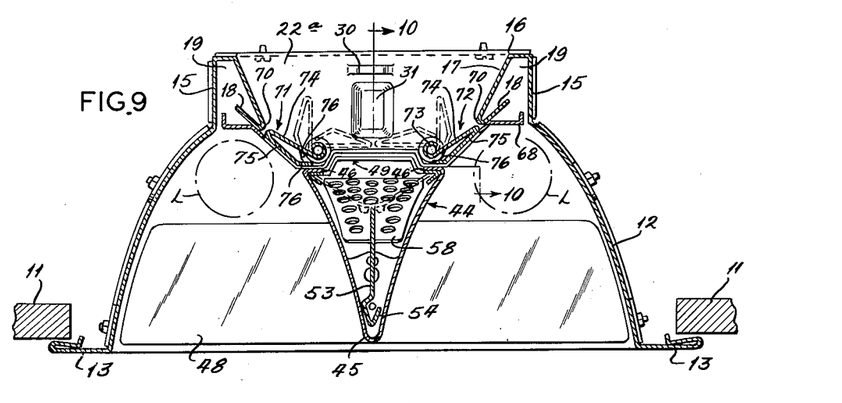
Fig. 9 is a view similar to Fig. 8, but with the adjustable vanes in a different setting.
Figure 10:
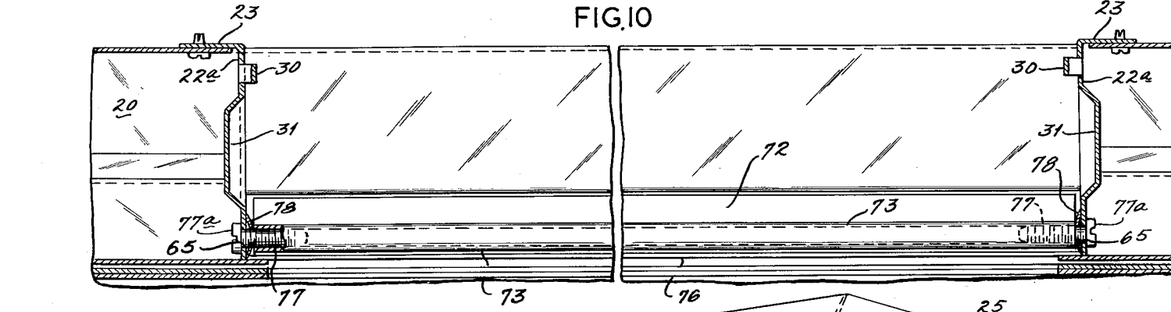
Fig. 10 is a longitudinal sectional elevational view of the modified apparatus of Fig. 9 to show a typical mounting of the movable and adjustable vanes.
Figure 14:
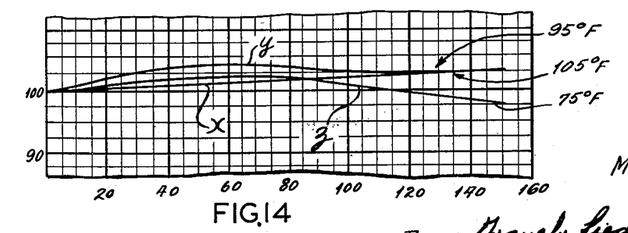
Fig. 14 is a graphic disclosure of the effect of warm air flow through the apparatus of Fig. 13 upon the lighting output efficiency.

Fig. 13 illustrates the apparatus of Figs. 8 and 9 with the adjustable vanes moved to the broken line position so that the center as well as side openings may be used to admit air to the body 12 and into the space below the ceiling tiles 11. The setting of the vanes indicates a use for warm air delivery so that the streams C entering the V-shaped louver 45 mingle with other streams E entering behind the lamps L and a resultant main stream is created. The streams E pass adjacent the lamps L and tend to maintain the temperature at a relatively steady state in the range of air volume movement which is most always used. For example, in Fig. 14 which represents the operation of the apparatus in Fig. 13, the lamp output efficiency compared to static conditions is very close to 100% (the ordinate) and remains so over a range of air flow from 60 to 80 cubic feet per minute (abscissa) and above. Specifically in Fig. 14, the curve X is for air supplied at 105° F., the curve Y is for 95° F. air, and the curve Z is for 75° F. air. The efficiency is actually found to increase above 100%, but the relative values are merely indicative of the improved performance which is obtained, and should not be construed otherwise.

Figure 16:
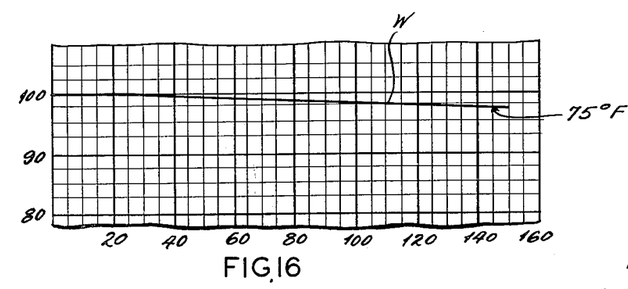
Fig. 16 is a graphic disclosure of the effect of exhaust air flow upon the lighting output in the apparatus shown in Fig. 15.

Fig. 15 illustrates a plenum space in the area above the ceiling of tiles 11, with the apparatus 10 suspended in the ceiling to communicate with the plenum through opening 16, the cover 25 being removed. An exhaust fan (not shown) associated with the plenum induces air flow upwardly through the apparatus 10 in somewhat the flow pattern depicted by the arrows F. The vanes 71 and 72 are closed over the V-shaped louver 45 as is shown in line in Fig. 8 to prevent dust laden exhaust air passing into the louver 45 and clogging up the perforations. The exhaust air being at average temperatures, say 75° F., the light efficiency for average ranges of air flow in c.f.m. is shown by curve W in Fig. 16. The relative efficiency of the lamps L drops off in the higher air flow range because of the effect on the lamp temperature, but the same effect is also noted in curve Z of Fig. 14 for air temperature of 75° F.

Figure 4:
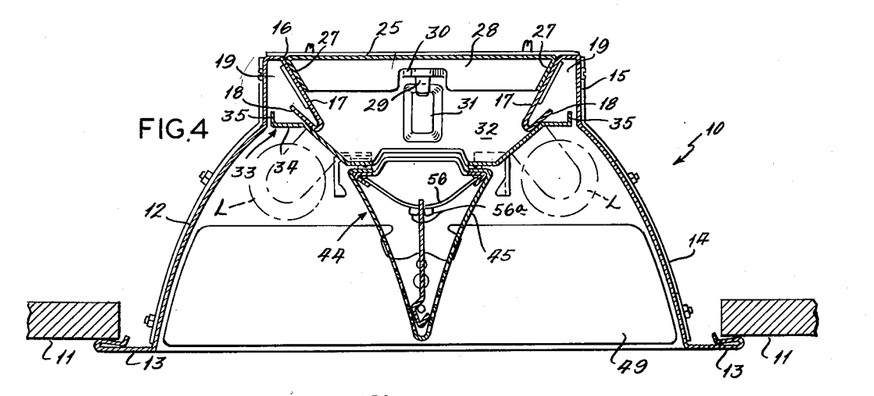
Fig. 4 is a transverse sectional elevational view taken at line 4—4 in Fig. 1.

Obviously the apparatus of Fig. 4 may be used in the system shown by Fig. 13 or 15 by suitable arrangement of the knockouts in partition 33.

There has been shown and described herein lighting apparatus in which air supply and return systems may be incorporated in a simple and positive manner, and a relatively low cost. The advantages therefor will be appreciated now that the principles of the invention are understood, but other modes of constructing a lighting fixture to embody the invention may occur after understanding the present embodiments and all such consructions are intended to be included within the possible scope of the annexed claims.

What is claimed is:

1. An air distribution lighting apparatus having an open sided body for the emission of light and air and closed at the opposite side by a head structure, said body having opposite side walls curved and extended to said head structure from adjacent the open side, said head structure having side and end walls and a top wall having an aperture between the end wall extremities thereof, wall means extending inwardly from said top wall of said head structure adjacent said aperture and separating the space within said head structure into an air box communicating with said aperture and an electrical box adjacent the air box but separated therefrom by said inwardly extending wall means, a partition member carried by said body inwardly of said open side of the body and extending across the space between said curved side walls inwardly of the open side of the body and adjacent said head structure to abut said inwardly extending wall means and form a removable closure wall for said air and electrical boxes, said partition member having at least one air flow aperture therein open to said air box and having a light reflecting surface, a hollow V-shaped member having convergent side walls with perforations therein opening between said hollow member and the open side of said body, said V-shaped member abutting on said partition member to communicate with the air flow aperture therein, and lamp means carried by said body adjacent to said light reflecting surface.

2. The apparatus set forth in claim 1 wherein, the hollow V-shaped member has its convergent side wall spaced from the curved side walls of the body and curved to form a parabolic cavity at each side of said V-shaped member, and said partition member has a plurality of knock out panels therein which are selectively removable to establish air flow communication to said hollow member and to the parabolic cavity at each side of the latter member.

3. Apparatus for lighting a room space and for passing air between the room space and a remote space, said apparatus including an elongated body having an open side facing the room space, the open side defined by opposed longitudinal walls and transverse end walls, an elongated head structure having a top wall and depending walls connected to the walls of said elongated body to form a space along the top wall in said head structure, a partition carried in said apparatus to separate said space in the head structure from the rest of the body of the apparatus, other wall means in said head structure space engaged with said partition and disposed to form with said head structure and partition an elongated air box intermediate the length of the apparatus, said top wall having an air flow aperture therein open to said air box from the remote space and said partition having an air flow aperture therein open to said air box from the body of the apparatus below the partition, space illuminating means in the apparatus below said partition and spaced from said partition air flow aperture, and air diffuser means carried by said partition in position to extend toward the open side of said body beyond said illuminating means, said diffuser means being open to said partition air flow aperture.

4. Apparatus for lighting a room space and for passing a flow of air between the room space and a space remote therefrom, said apparatus comprising an elongated body having side walls in spaced relation and end closure means forming a body space open at one side to the room space, a head structure on said body closing the same opposite the open side, said head structure including a top wall extending between said end closure means and depending walls joining said body side walls, a partition member in said body adjacent said head structure to close the head structure from the body space, wall means in said head structure extending between said top wall and said partition member and dividing the space therein into end spaces and an intermediate space, sockets carried in said end spaces to project into the body space, lamp means carried by said sockets in the body space adjacent said partition member, said head structure having an aperture therein opening to said intermediate space and said partition member having an aperture therein substantially coextensive with said intermediate space, and movable flow directing means mounted in said head structure adjacent said aperture in said partition member, said movable means being selectively positionable to direct the flow of air through different areas of said aperture.

5. Apparatus for lighting a room space and for passing a flow of air between the room space and a space remote therefrom, said apparatus comprising an elongated body having side walls in spaced relation and end closure means forming a body space open at one side to the room space, a head structure on said body closing the same opposite the open side, said head structure including a top wall extending between said end closure means and depending walls joining said side walls. a partition member in said body adjacent said head structure and extending between said end closure means and said depending walls to close the head structure from the body space, wall means in said head structure extending between said top wall and partition member dividing the space therein into end spaces and an intermediate space, sockets carried in said end spaces to project into the body space, lamp means carried by said sockets in the body space adjacent said partition member, said head structure having an aperture opening through a wall thereof to said intermediate space and said partition member having an aperture therein substantially coextensive with said intermediate space, movable vanes carried by certain of said wall means adjacent said aperture in said partition member, and a hollow perforated wall V-shaped louver adjacent said partition member between said body side walls, the hollow of said louver being open toward said aperture in said partition member and said vanes being selectively movable between adjacent positions closing air flow to said hollow louver and remote positions closing air flow around said louver.

6. In apparatus of the character described a troffer body comprised of side walls and end closure means having an open side, a head structure on said body closing the opposite side and comprising a top wall extending between said end closure means and depending walls joining said body side walls, a partition member in said body extending between said end closure means and abutting said depending walls and closing the space in said head structure from the remainder of the body space inwardly of the open side, a hollow louver of V-shaped cross-section having spaced walls formed with a plurality of holes perforating the surfaces thereof, means securing said louver in abutment with the surface of said partition member remote from said space in said head structure, said partition member having a width substantially greater than the spaced walls of said louver to expose a surface to the body space at each side of said louver, a plurality of knock-out panels formed in said partition member in the surface abutted by said louver and in said exposed surfaces at each side of said louver, said knock-out panels being selectively removable, and an aperture in said head structure communicating with the space in said head structure for air flow between said aperture and the openings formed in said partition member upon removal of one or more of said knock out panels.

References Cited in the file of this patent

UNITED STATES PATENTS

| | | |
|---|---|---|
| 2,655,348 | Siering | Oct. 13, 1953 |
| 2,730,942 | Peterson | Jan. 17, 1956 |
| 2,833,199 | Wakefield | May 6, 1958 |
| 2,845,854 | Kurek | Aug. 5, 1958 |
| 2,845,855 | Burns | Aug. 5, 1958 |